2,778,810
Patented Jan. 22, 1957

2,778,810

ELASTOMERS DERIVED FROM POLYISOCYANATE MODIFIED POLYESTERS

Erwin Müller, Leverkusen-Bayerwerk, and Siegfried Petersen, Leverkusen-Schlebusch, Germany, assignors to Farbenfabriken Bayer Aktiengesellschaft, Leverkusen, Germany, a corporation of Germany No Drawing. Application September 23, 1952, Serial No. 311,146

11 Claims. (Cl. 260—45.4)

The present invention relates to polymeric products and more particularly to elastomers derived from polyisocyanate modified polyesters.

It has been proposed to produce a rubber-like highly molecular product by cross-linking linear polyester chains by means of urea groups. The introduction of the urea groups in this case occurs by reacting polyesters with diisocyanates. The employment of a small excess of diisocyanate over the amount calculated as equivalent to the hydroxyl end groups of the polyester results in molecules with isocyanate end groups. The action of diamines and water on these isocyanate modified polyesters causes urea linkage between two isocyanate groups, the chains being further lengthened, whereafter these urea groups cross-link with further excess diisocyanate, yielding rubber-like products.

The present invention consists in an improvement of this method and has for an object an improved and simplified process for the production of elastomers derived from polyisocyanate modified polyesters.

Another object is the provision of new and improved polymeric products.

Further objects will become apparent as the following specification proceeds.

The objects are accomplished by reacting a dehydrated substantially linear polyester with a polyisocyanate in an excess of from 100 to 600 percent of the amount necessary to combine with the hydroxyl groups of said polyester and causing the isocyanate modified polyester thus formed to react with a diprimary aromatic diamine in a proportion to combine with at least one fourth to at most all of the isocyanate groups of the polyester. The entire class of the diprimary aromatic diamines is operable.

Although the mechanism of the reaction is not entirely clear, the following chemical reactions are believed to occur: If polyesters containing hydroxyl groups are reacted with polyfunctional isocyanates, the possibility of a lengthening of the chains decreases with increasing amounts of polyisocyanate. At the same time the number of non-reacted isocyanate groups rises. If a small excess of polyisocyanate is employed, the chains of the polyester are lengthened and isocyanate end groups result. According to the present invention the polyisocyanates are employed in an excess of at least 100 percent. In this case no lengthening of the chains occurs at all. If an excess of exactly 100 percent is employed, the only result is that the hydroxyl polyester is converted into an isocyanate polyester. If the amounts of polyisocyanate are further increased, free polyisocyanate will remain in the mixture. The after-treatment with diamines then causes a linking of the isocyanate polyester chains by means of urea linkages. Free polyisocyanates react with diamines at the same time and yield polyureas. The organic polyisocyanates and the primary aromatic diamines are free from other reactive groups. Since the amount of diamine is limited to correspond at most to the free isocyanate groups, free isocyanate groups may remain in the mixture, which can react with the urea groups with cross-linking. The finished product may therefore be regarded as a polyurea having incorporated therein a polyester which acts as a plasticizer. Products of extraordinarily good mechanical properties are obtained, which furthermore are distinguished by their high resistance to acids and alkalies.

The polyesters employed as starting materials should be substantially linear. It is, however, an important feature of the present invention that the polyesters employed need not be obtained exclusively from bifunctional reactants. The process is applicable also to such cases, in which apart from a predominating number of bifunctional components a slight amount of polyfunctional components are employed. For instance, it is possible to work with polyesters which for every 27 mols of a bifunctional alcohol contain one mol of a trifunctional alcohol. Furthermore to a certain extent polyfunctional isocyanates may be employed. However, it is to be understood, that the polyesters should be mainly linear, and the term "substantially linear" as used herein only includes such polyesters in which the bifunctional reactants predominate.

The properties of the products obtainable by the process is largely determined by the excess of the polyisocyanate and the amount of diamine calculated therefrom. Those compounds having the lowest polyisocyanate content are the most flexible and elastic, while compounds having 300 to 400 percent excess of polyisocyanate and diamine, calculated on the hydroxyl groups of the polyester, have a lower elasticity and elongation, while their hardness is increased, the excellent properties of tenacity being maintained. These products are not brittle, in spite of their hardness, in contrast to phenol formaldehyde or urea formaldehyde condensation products. Only if an excess of polyisocyanate of over 500 percent is employed, the elasticity of the products decreases appreciably. For the purpose of this invention the excess of polyisocyanate should therefore not exceed 600 percent.

The amount of diamine is calculated on the excess of polyisocyanate and should be so adapted as to combine with from about 25 to about 100 percent of the isocyanate groups present. The application of less diamine leads to products which are not free from bubbles, owing to the fact that the excess isocyanate decomposes.

Of the polyisocyanates, especially toluylene diisocyanate, 1.5-naphthylene diisocyanate, nitrobenzidine diisocyanate, triphenylmethane triisocyanate and the like are preferred. As diprimary aromatic diamines, such as toluylene diamine, o-dichlorobenzidine, nitrobenzidine, 4-amino-2'-amino-diphenyl, dianisidine, diamino phenetole, 4.4'-diamino-diphenyl methane, 3.3'-dichloro-4.4'-diamino-diphenyl methane, 1.5-naphthylene diamine, phenylene diamine and 2.5-dichloro-phenylene diamine may be employed.

The working up may be carried out in the liquid or in the solid state. For working up in the liquid state the relation between diisocyanate and diamine is important. As pointed out in the copending application Ser. No. 102,941, filed July 2, 1949, by Müller, now Patent No. 2,620,516, the reactivity of the diisocyanates and the diamines should be adapted to each other. If highly reactive diisocyanates are employed, the diamines should be so selected as to have only slight reactivity and vice versa. Working up in the liquid state renders possible the casting of shaped articles and the casting of foils which possess a leatherlike appearance. In view of the high dielectric constant of the products the casting process is of interest also in the electrical industry for the coating of condensers and electric cable joints. If it is desired to work up in the solid state, the condensation is carried out in the kneading machine, a material being obtained which may be easily shaped under pressure without further rolling even after storing for four weeks. Both processes allow the incorporation of fillers in substantial amounts without influencing the mechanical properties of the product to any extent. Talcum, titanium dioxide, asbestos, mixtures of asbestos with iron powder and the like have been found to be specially valuable. Such products are suitable as packing materials.

The polyesters employed as starting materials are mainly built up from aliphatic dicarboxylic acids and polyalcohols, such as ethylene glycol, glycerol etc., but may also contain aromatic components. In the condensation of the polyesters the proportions are preferably so selected that hydroxyl groups prevail, since carboxylic acid groups yield $CO_2$ on reaction with isocyanates and would thus cause inconveniences, especially when working in the liquid state. The hydroxyl number of the polyesters should be between 20–80, i. e. the polyesters should contain 0.6–2.4 percent by weight of hydroxyl groups. Copolyesters containing more than two or three components and mixed polyesters may be employed for the reaction.

*Example 1*

2 kilograms of a glycol-adipic-acid-polyester having a hydroxyl number of 53 are dehydrated for two hours at 130° C. under 12 mm. pressure in a vacuum kneading machine. 760 grams of toluylene-diisocyanate are then poured in and after a period of 20 minutes 790 grams of o-dichlorobenzidine are introduced. After some time the viscosity of the melt which is at first thinly liquid increases and after another 15 minutes a crumbly, storable product is obtained which may be molded under pressure at 150 to 170° C. The mechanical properties of the plastic plates obtained are as follows:

Tensile strength _____kg./cm.$^2$__ 266.4
Elongation at break_____percent__ 121
Permanent set _____do____ 14.6
Tear resistance _____kg./cm.$^2$__ 263
Hardness _____ 99

Frames of automobile steering wheels were imbedded in the product by molding.

Instead of the glycol-adipic-acid-polyester, propylene-glycol-1.2-adipic-acid-polyester or mixtures of both esters may be employed.

If the dichlorobenzidine above is replaced by 386 grams of toluylene diamine, the reaction conditions and proportions remaining unchanged otherwise, a product of the following properties is obtained:

Tensile strength _____kg./cm.$^2$__ 156
Elongation at break_____percent__ 117
Permanent set _____do____ 15.7
Tear resistance _____kg./cm.$^2$__ 124
Hardness _____ 95

An exchange of toluylene diamine for 580 grams of 4-amino-2'-aminodiphenyl results in a somewhat softer product with the following characteristics:

Tensile strength _____kg./cm.$^2$__ 194
Elongation at break_____percent__ 282
Permanent set _____do____ 70
Tear resistance _____kg./cm.$^2$__ 15.3
Hardness _____ 88

*Example 2*

2 kilograms of talcum were mixed into 2 kilograms of a glycol-adipic-acid-polyester having a hydroxyl number of 53 and an acid number of one, and the mixture was dehydrated for two hours at 130° C. in a kneading machine. 760 grams of toluylene diisocyanate were then added and left to react for 30 minutes, whereafter 580 grams of 4-amino-2'-diphenylamine were introduced. Shortly afterwards the liquid melt became crumbly and could then be molded. Packings were made of the product which had the following mechanical properties:

Tensile strength _____kg./cm.$^2$__ 178
Elongation at break_____percent__ 164
Permanent set _____do____ 70
Hardness _____ 98

*Example 3*

500 grams of glycol-adipic-acid-polyester were dehydrated for one hour at 130° C. in a vessel provided with a stirrer. 140 grams of toluylene diisocyanate were added and left to react for 20 minutes. Then a solution of 125 grams of dichlorobenzidine in 200 cc. of chlorobenzene was added, and the contents of the vessel were well stirred. A foil was cast from the resultant liquid melt. After a short period of time the foil could be removed from its support which was heated to 80 to 100° C. The foil was heated for another ten hours at 100° C. in a drying oven and then showed the following characteristics:

Tensile strength _____kg./cm.$^2$__ 348
Elongation at break_____percent__ 476
Hardness _____ 95

Massive objects, plates and the like could be cast in a similar manner.

*Example 4*

2 kilograms of a propylene-glycol-1.2-adipic-acid-polyester were dehydrated as described above and reacted with 760 grams of toluylene diisocyanate. After a period of reaction of 15 minutes, 790 grams of o-dichlorobenzidine were added and the crumbly condensation product obtained was molded to plates. The properties of these plates were as follows:

Tensile strength_____kg./cm.$^2$__ 106
Elongation at break_____percent__ 92
Permanent set_____do____ 46
Tear resistance_____kg./cm.$^2$__ 24.5
Hardness_____ 95

*Example 5*

2 kilograms of the glycol-adipic-acid-ester dehydrated as described above were reacted at 130° C. with 600 grams of 1.5-naphthylene-diisocyanate. The temperature rose by about 10 to 12° C. After the addition of 432 grams of o-dichlorobenzidine, the viscous mass soon solidified. By molding the product very hard plates were obtained, which were nevertheless still flexible.

Tensile strength_____kg./cm.$^2$__ 253
Elongation at break_____percent__ 284
Permanent set_____do____ 13.8
Hardness_____ 96

If the 1.5-naphthylene diisocyanate is replaced by 1044 grams of triphenylmethane triisocyanate under the above conditions, a very hard product with the following properties is obtained:

Tensile strength_____kg./cm.$^2$__ 122
Hardness_____ 360
Elongation at break_____percent__ 19

*Example 6*

200 grams of a polyester containing hydroxyl groups and obtained from 146 grams of adipic acid, 70 grams of ethylene glycol and 5 grams of trimethylol propane are dehydrated as usual, reacted at 130° C. with 76 grams of toluylene diisocyanate and subsequently treated with 79 grams of dichlorobenzidine. The crumbly material is molded into plates which possess the following characteristics:

Tensile strength_____kg./cm.$^2$__ 212
Hardness_____ 749
Elongation at break_____percent__ 176

Example 7

2 kilograms of a glycol-adipic-acid-polyester having a hydroxyl number of 55 are dehydrated for two hours at 130° C. under 12 mm. pressure in a vacuum kneading machine. 760 grams of toluylene-diisocyanate are then poured in, and after a period of 20 minutes, 338 grams of p-phenylene-diamine are introduced. After 15 to 25 minutes a storable product is obtained, which may be molded under pressure at 150 to 170° C.

Example 8

2 kilograms of a glycol-adipic-acid-polyester having a hydroxyl number of 55 are dehydrated for two hours at 130° C. under 12 mm. pressure in a vacuum kneading machine. 760 grams of toluylene-diisocyanate are then poured in, and after a period of 20 minutes, 762 grams of dianisidine are introduced. After 15 to 25 minutes a product of great tensile strength and hardness is obtained.

Example 9

200 grams of a polyester obtained by reacting 146 grams of adipic acid, 70 grams of ethylene glycol and 5 grams of trimethylol propane were reacted at 130° C. with 76 grams of toluylene diisocyanate. After the addition of 47.5 grams of diamino phenetole a crumbly product is obtained, which may be molded into plates.

Example 10

2 kilograms of a glycol-adipic-acid-polyester having a hydroxyl number of 55 are dehydrated for two hours at 130° C. under 12 mm. pressure in a vacuum kneading machine. 600 grams of 1.5-naphthylene-diisocyanate are then poured in, and after a period of 20 minutes, 455 grams of 3.3'-dichloro-4.4'-diamino-diphenyl-methane are introduced. After 15 to 25 minutes a product of great tensile strength and hardness is obtained.

Example 11

2 kilograms of a propylene glycol-adipic-acid-polyester having a hydroxyl number of 55 are dehydrated for two hours at 130° C. under 12 mm. pressure in a vacuum kneading machine. 760 grams of toluylene-diisocyanate are then poured in, and after a period of 20 minutes, 490 grams of 1.5-naphthylene-diamine are introduced. A material showing a great hardnes and good workability is obtained.

Example 12

2 kilograms of a glycol-adipic-acid-polyester having a hydroxyl number of 55 are dehydrated for two hours at 130° C. under 12 mm. pressure in a vacuum kneading machine. 760 grams of toluylene-diisocyanate are then poured in, and after a period of 20 minutes, 550 grams of 2.5-dichloro-phenylene-diamine are introduced. By molding the product very hard plates were obtained, which were nevertheless still flexible.

This application is a continuation-in-part application of our copending application Serial No. 144,195, filed February 14, 1950, and abandoned about October 17, 1952.

We claim:

1. A process of producing polymeric products, which comprises reacting a dehydrated, substantially linear polyester having from 0.6 to 2.4 percent by weight of hydroxyl groups with an organic polyisocyanate in an excess of from about 190 to 600 percent over the amount necessary to combine with the hydroxyl groups of said polyester, and causing the isocyanate-modified polyester thus formed to react with a diprimary aromatic diamine in a proportion to combine with at least one fourth to at most all of the isocyanate groups present.

2. A process of producing polymeric products, which comprises reacting a dehydrated, substantially linear polyester having from 0.6 to 2.4 percent by weight of hydroxyl groups with an organic diisocyanate in an excess of from about 190 to 600 percent over the amount necessary to combine with the hydroxyl groups of said polyester, and causing the isocyanate-modified polyester thus formed to react with a diprimary aromatic diamine in a proportion to combine with at least one fourth to at most all of the isocyanate groups present.

3. A process of producing polymeric products, which comprises reacting a dehydrated, substantially linear polyester having from 0.6 to 2.4 percent by weight of hydroxyl groups with an aromatic diisocyanate in an excess of from about 190 to 600 percent over the amount necessary to combine with the hydroxyl groups of said polyester, and causing the isocyanate-modified polyester thus formed to react with a diprimary aromatic diamine in a proportion to combine with at least one fourth to at most all of the isocyanate groups present.

4. A process of producing polymeric products, which comprises reacting a dehydrated, substantially linear polyester having from 0.6 to 2.4 percent by weight of hydroxyl groups with an aromatic polycyclic diisocyanate in an excess of from about 190 to 600 percent over the amount necessary to combine with the hydroxyl groups of said polyester, and causing the isocyanate-modified polyester thus formed to react with a diprimary aromatic diamine in a proportion to combine with at least one fourth to at most all of the isocyanate groups present.

5. The process of producing a polymeric product, which comprises reacting a dehydrated glycol-adipic-acid-polyester having a hydroxyl number of from 40 to 60, with a 1.5-naphthylene diisocyanate at a temperature of from 100 to 150° C. in an excess of from about 190 to 600 percent over the amount necessary to combine with the hydroxyl groups of said polyester, causing the isocyanate modified polyester thus formed to react with dichlorobenzidine in a proportion to combine with at least one fourth to at most all of the isocyanate groups present, and molding the product obtained.

6. The process of producing a polymeric product, which comprises reacting a dehydrated glycol-adipic-acid-polyester having a hydroxyl number of from 40 to 60, with a triphenylmethanetriisocyanate at a temperature of from 100 to 150° C. in an excess of from about 190 to 600 percent over the amount necessary to combine with the hydroxyl groups of said polyester, causing the isocyanate modified polyester thus formed to react with dichlorobenzidine in a proportion to combine with at least one fourth to at most all of the isocyanate groups present, and molding the product obtained.

7. A tough, elastic polymeric product which comprises the reaction product of an organic isocyanate modified polyester obtained from a substantially linear polyester having from 0.6 to 2.4 percent by weight of hydroxyl groups and an excess of from about 190 to 600 percent of an organic polyisocyanate over the amount necessary to combine with the hydroxyl groups of said polyester, with a diprimary aromatic diamine in a proportion to combine with at least one fourth to at most all of the isocyanate groups present.

8. A tough, elastic polymeric product which comprises the reaction product of an organic isocyanate modified polyester obtained from a substantially linear polyester having from 0.6 to 2.4 percent by weight of hydroxyl groups and an excess of from about 190 to 600 percent of an organic diisocyanate over the amount necessary to combine with the hydroxyl groups of said polyester, with a diprimary aromatic diamine in a proportion to combine with at least one fourth to at most all of the isocyanate groups present.

9. A tough, elastic polymeric product which comprises the reaction product of an organic isocyanate modified polyester obtained from a substantially linear polyester having from 0.6 to 2.4 percent by weight of hydroxyl groups and an excess of from about 190 to 600 percent of an aromatic diisocyanate over the amount necessary to combine with the hydroxyl groups of said polyester, with a diprimary aromatic diamine in a proportion to combine with at least one fourth to at most all of the isocyanate groups present.

10. A tough, elastic polymeric product which comprises the reaction product of an organic isocyanate modified polyester obtained from a substantially linear polyester having from 0.6 to 2.4 percent by weight of hydroxyl groups and an excess of from about 190 to 600 percent of an aromatic polycyclic diisocyanate over the amount necessary to combine with the hydroxyl groups of said polyester, with a diprimary aromatic diamine in a proportion to combine with at least one fourth to at most all of the isocyanate groups present.

11. The process of producing a solid polymeric product, which comprises reacting a dehydrated glycol-adipic-acid-polyester having a hydroxyl number of from 40 to 60, with a toluylene diisocyanate at a temperature of from 100 to 150° C. in an excess of from about 190 to 600 percent over the amount necessary to combine with the hydroxyl groups of said polyester, causing the isocyanate modified polyester thus formed to react with dichlorobenzidine in a proportion to combine with at least one fourth to at most all of the isocyanate groups present, and molding the solid product obtained.

References Cited in the file of this patent

UNITED STATES PATENTS

| | | |
|---|---|---|
| 2,620,516 | Muller | Dec. 9, 1952 |
| 2,621,166 | Schmidt et al. | Dec. 9, 1952 |
| 2,625,531 | Seeger | Jan. 13, 1953 |